United States Patent
Du et al.

(10) Patent No.: US 12,395,441 B2
(45) Date of Patent: Aug. 19, 2025

(54) DATA PACKET TRANSMISSION METHOD AND DEVICE

(71) Applicants: China Mobile Communication Co., Ltd Research Institute, Beijing (CN); China Mobile Communications Group Co.,Ltd., Beijing (CN)

(72) Inventors: Zongpeng Du, Beijing (CN); Yuexia Fu, Beijing (CN); Xiaoqiu Zhang, Beijing (CN); Liang Geng, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 259 days.

(21) Appl. No.: 18/043,429

(22) PCT Filed: Aug. 30, 2021

(86) PCT No.: PCT/CN2021/115324
§ 371 (c)(1),
(2) Date: Feb. 28, 2023

(87) PCT Pub. No.: WO2022/048514
PCT Pub. Date: Mar. 10, 2022

(65) Prior Publication Data
US 2023/0327995 A1    Oct. 12, 2023

(30) Foreign Application Priority Data

Sep. 2, 2020    (CN) .......................... 202010908599.4

(51) Int. Cl.
*H04L 47/2425*    (2022.01)
*H04L 45/00*    (2022.01)
(Continued)

(52) U.S. Cl.
CPC ........ *H04L 47/2425* (2013.01); *H04L 45/306* (2013.01); *H04L 45/50* (2013.01); *H04L 45/566* (2013.01); *H04L 47/20* (2013.01)

(58) Field of Classification Search
CPC ... H04L 47/2425; H04L 45/306; H04L 45/50; H04L 45/566; H04L 47/20; H04L 45/24; H04L 45/74; H04L 45/34; H04L 47/125
See application file for complete search history.

(56) References Cited

U.S. PATENT DOCUMENTS

| | | | |
|---|---|---|---|
| 6,430,184 B1 | 8/2002 | Robins et al. | |
| 7,414,979 B1 * | 8/2008 | Jarvis | ...................... H04L 47/10 370/386 |

(Continued)

FOREIGN PATENT DOCUMENTS

| | | |
|---|---|---|
| CN | 103281252 A | 9/2013 |
| CN | 105721307 A | 6/2016 |

(Continued)

*Primary Examiner* — Kibrom T Hailu
(74) *Attorney, Agent, or Firm* — Price Heneveld LLP

(57) ABSTRACT

A method and a device for transmitting a data packet are provided. The method includes: receiving a first data packet from a second node, wherein the first data packet includes first information indicating a dynamic load-sharing request; selecting, according to the first information, a first path for forwarding the first data packet, and recording an identifier of the first path; receiving a second data packet from the second node, wherein the second data packet includes an identifier of the first path, and the second data packet is a data packet, after the first data packet, of a same traffic; selecting, according to the identifier of the first path, the first path to forward the second data packet.

14 Claims, 13 Drawing Sheets

(51) Int. Cl.
*H04L 45/302* (2022.01)
*H04L 45/50* (2022.01)
*H04L 47/20* (2022.01)

(56) References Cited

U.S. PATENT DOCUMENTS

| | | | | |
|---|---|---|---|---|
| 8,879,397 | B2* | 11/2014 | Xi | H04L 43/10 |
| | | | | 370/237 |
| 8,976,647 | B2* | 3/2015 | Song | H04L 47/34 |
| | | | | 370/395.2 |
| 2010/0149979 | A1* | 6/2010 | Denecheau | H04L 45/124 |
| | | | | 370/234 |
| 2016/0072702 | A1 | 3/2016 | Gao et al. | |
| 2017/0310583 | A1 | 10/2017 | Bernstein et al. | |
| 2017/0318078 | A1* | 11/2017 | Mahadevan | H04L 65/403 |
| 2017/0324664 | A1* | 11/2017 | Xu | H04L 12/4633 |
| 2018/0054389 | A1 | 2/2018 | Ao | |
| 2018/0109450 | A1* | 4/2018 | Filsfils | H04L 45/04 |

FOREIGN PATENT DOCUMENTS

| | | |
|---|---|---|
| CN | 106034087 A | 10/2016 |
| CN | 109495930 A | 3/2019 |
| CN | 111385206 A | 7/2020 |
| WO | 2017140112 A1 | 8/2017 |

\* cited by examiner

DATA PACKET TRANSMISSION METHOD AND DEVICE

CROSS-REFERENCE TO RELATED APPLICATION

This application is a U.S. national phase application of a PCT Application No. PCT/CN2021/115324 filed on Aug. 30, 2021, which claims a priority to Chinese Patent Application No. 202010908599.4 filed on Sep. 2, 2020, the disclosures of which are incorporated in their entirety by reference herein.

TECHNICAL FIELD

The present disclosure relates to a method and a data packet transmission device, and in particular, relates to a method and a device for transmitting Application-aware Networking (APN) data packets.

BACKGROUND

In load-balancing technology of network traffic in the related art, such as equivalent load-sharing (Equal-Cost Multi-Path routing (ECMP)) and non-equivalent load-sharing (Unequal-Cost Multi-Path routing (UCMP)), HASH technology is generally used to separate the network traffic, to enable the network traffic to take a different path/link. Specifically, the network device performs HASH calculation according to characteristics of the network traffic, for example according to information such as a Virtual Local Area Network (VLAN) of an Ethernet packet, or a five-tuple of an IP packet, or a source address and a flow identifier of an IPv6 packet.

The ECMP refers to that if there are N equivalent paths in a network, a network device uses the HASH calculation to divide the traffic into N parts as evenly as possible, and each part goes on a path, thus making the network traffic more evenly distributed in the network. The UCMP refers to that weights associated with the N equivalent paths are given, that is, it is supported that traffic (or copies) taken by different paths are not evenly distributed, but are determined according to the weights of different paths. For example, two paths have a weight ratio of 1:3, and in one implementation, the network device will divide traffic equally into four parts (via a suitable HASH algorithm), with the first path taking one part and the second path taking three parts.

However, all current HASH implementations are static (including ECMP and UCMP), once Weight/the number of parts is determined, it cannot be changed, that is, current load-sharing only supports execution performed according to static weights/weight parameters, dynamic weight parameters cannot be used. That is, determination of the weights currently supports for example only a bandwidth of a path (static), but does not support the load of the path (dynamic).

Because if the static weight (Weight) of the path is forcibly changed, the traffic will be out of order, for example, the weights of load-sharing of a path1, a path2, a path3, is 1:3:4, device implementation is generally done according to ECMP, that is, the traffic is divided into 8 parts, 1 part goes to the path1, 3 parts go to the path2, 4 parts go to the path3.

If the weights are changed to 2:2:4, then traffic of a flow appeared at the path2 are then changed to the path1, the flow may be out of order, causing that the destination may need reordering, which is not suitable for some traffic in the network, for example, a service with high real-time requirement.

SUMMARY

An object of embodiments of the present disclosure is to provide a method and a device for transmitting data packets. In a scenario where a network deploys a Segment Routing Policy (SR-Policy), how to make better use of network resources and/or computing power resources is a problem to be solved.

In a first aspect, a data packet transmission method performed by a first node is provided. The method includes: receiving a first data packet from a second node, wherein the first data packet includes first information, the first information indicates a dynamic load-sharing request; selecting, according to the first information, a first path for forwarding the first data packet, and recording an identifier of the first path; receiving a second data packet from the second node, wherein the second data packet includes an identifier of the first path, and the second data packet is a data packet, after the first data packet, of a same traffic; selecting, according to the identifier of the first path, the first path to forward the second data packet.

Optionally, selecting, according to the first information, the first path for forwarding the first data packet, and recording the identifier of the first path includes: selecting, according to the first information and a dynamic weight of the first path, the first path for forwarding the first data packet, and recording the identifier of the first path.

Optionally, the first data packet is a first Application-Aware Networking (APN) data packet, and the second data packet is a second APN data packet.

Optionally, the first data packet further includes second information, the second information represents a traffic demand. Selecting, according to the first information, the first path for forwarding the first data packet includes: performing matching, according to the second information, to obtain a path set; according to the first information, selecting, from the path set, the first path for forwarding the first packet.

Optionally, the path set is a SID list of SR Policy, or a set of SR Policy.

Optionally, the dynamic weights are associated with one or more of the following: network available resource information; remaining computing power information learned by a destination node on a second path, wherein the destination node of the second path exchanges information with a computing-power supply server.

In a second aspect, a data packet transmission method performed by a second node is provided. The method includes: sending a first data packet to a first node, wherein the first data packet includes first information, the first information indicates a dynamic load-sharing request; sending a second data packet to the first node, wherein the second data packet includes an identifier of the first path, and the second data packet is a data packet, after the first data packet, of a same traffic; wherein the first path is a path selected, according to the first information by the first node, for forwarding the first data packet.

Optionally, the first path is a path selected, according to the first information and a dynamic weight of the first path by the first node, for forwarding the first data packet.

Optionally, the first data packet is a first Application-Aware Networking (APN) data packet, and the second data packet is a second APN data packet.

Optionally, the identifier of the first path is identification information of a Segment Routing policy (SR Policy), or identification information of a Segment Identifier list (SID list) of the SR Policy.

Optionally, the dynamic weight is associated with one or more of following: network available resource information of the first path; remaining computing power information learned by a destination node on a second path, wherein the destination node of the second path exchanges information with the computing-power supply server.

In a third aspect, a data packet transmission device applied to a first node is provided. The device includes: a first receiving module, configured to receive a first data packet from a second node, wherein the first data packet includes first information, the first information indicates a dynamic load-sharing request; a first selecting module, configured to select, according to the first information, a first path for forwarding the first data packet, and record an identifier of the first path; a second receiving module, configured to receive a second data packet from the second node, wherein the second data packet includes an identifier of the first path, and the second data packet is a data packet, after the first data packet, of a same traffic; a second selecting module, configured to select, according to the identifier of the first path, the first path to forward the second data packet.

In a fourth aspect, a first node is provided. The first node includes: a processor, a memory, and a program stored on the memory and executable on the processor, wherein when the program is executed by the processor, the processor implements steps of the data packet transmission method according to the first aspect.

In a fifth aspect, a data packet transmission device applied to a second node is provided. The device includes: a first sending module, configured to send a first data packet to a first node, wherein the first data packet includes first information, the first information indicates a dynamic load-sharing request; a second sending module, configured to send a second data packet to the first node, wherein the second data packet includes an identifier of the first path, and the second data packet is a data packet, after the first data packet, of a same traffic; wherein the first path is a path selected, according to the first information by the first node, for forwarding the first data packet.

In a sixth aspect, a second node is provided. The second node includes: a processor, a memory, and a program stored on the memory and executable on the processor, wherein, when the program is executed by the processor, the processor implements the steps of the data packet transmission method according to the second aspect.

In a seventh aspect, a readable storage medium having stored thereon a program is provided. When the program is executed by a processor, the processor implements the steps of the method according to the first aspect or the second aspect.

In the embodiments of the present disclosure, in the scenario where a network deploys the Segment Routing Policy (SR-Policy), the dynamic load-sharing request may be adopted, so that the network resources and/or computing-power resources may be better utilized.

BRIEF DESCRIPTION OF THE DRAWINGS

Various other advantages and benefits will become apparent to those of ordinary skill in the art upon reading the following detailed description of the preferred embodiments. The drawings are for the purpose of illustrating preferred embodiments only and are not intended to be limiting of the present disclosure. The same reference numerals are used to designate the same components throughout the drawings.

DETAILED DESCRIPTION

In order to facilitate understanding of the embodiments of the present disclosure, the following technical points are described:

(1) Computing-Aware Network (CAN).

The CAN is a new network architecture designed for the development trend of computing network convergence, and interconnects distributed dynamically computing resources based on ubiquitous network connection. Through unified cooperative scheduling of multi-dimensional resources such as networks, storage and computing power, massive applications can call computing resources in different places on demand and in real time, and realize global optimization of connection and computing power in the network and provide a consistent user experience.

(2) Architecture of APN.

Figure 1:
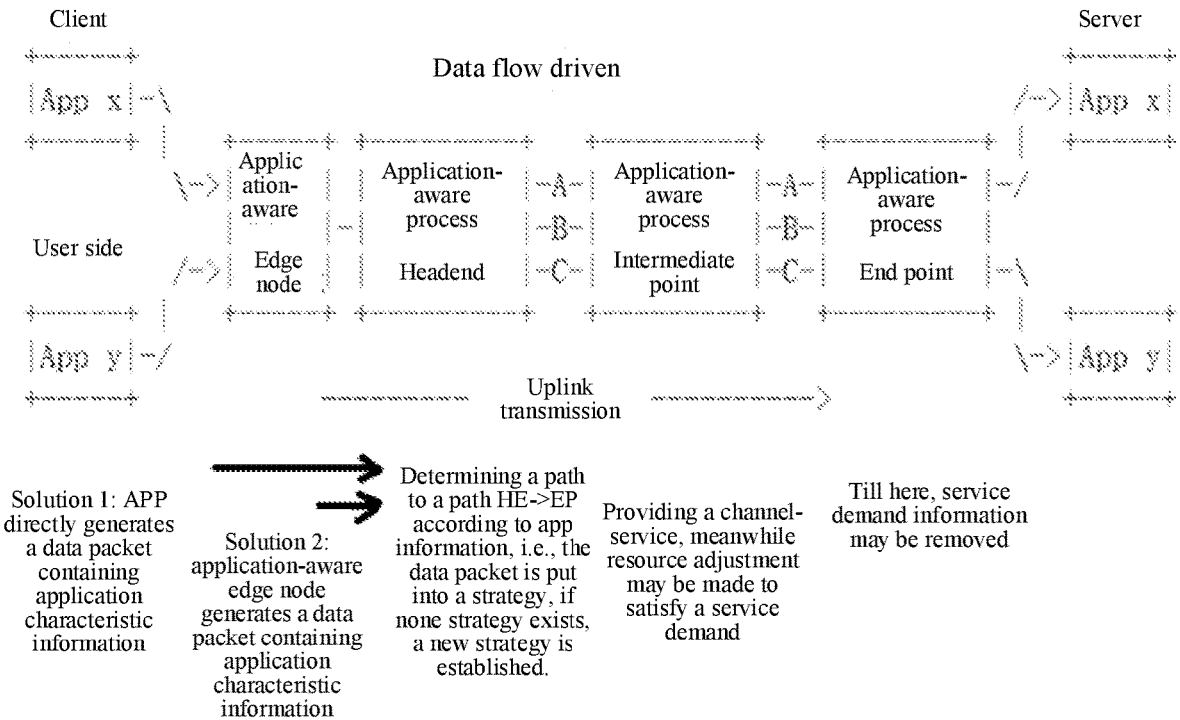
FIG. 1 is a schematic diagram of an APN.

It is difficult for the network at present to perceive services. In some scenarios such as 5G, Internet of Things (IoT) edge computing and other scenarios, there are more and more services with Critical QoS (Quality of Service). It is difficult for traditional ACL and DPI to support identification of these services. The requirements of these services may be a bandwidth, a delay, a jitter, and a packet loss rate. It is recommended that these information be carried in the packet to enable connection of the network and services, see FIG. 1.

(3) Segment Routing Policy (SR-Policy) Architecture.

Figure 2:
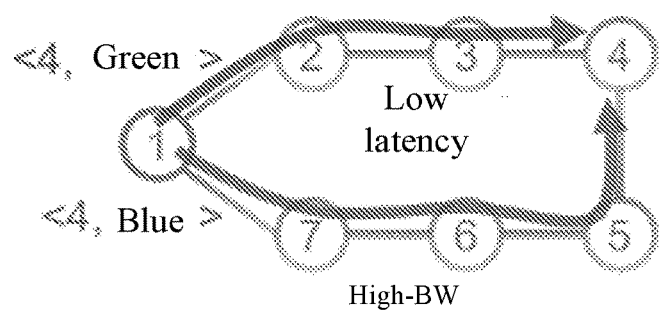
FIG. 2 is an introduction schematic diagram of a SR-Policy.

The identifier of an SR Policy is a triplet <a head-end, an end point, a color>, where the color is a numerical value and the meaning of the color can be understood as an intent such as "green" and "blue" in FIG. 2.

Figure 3:
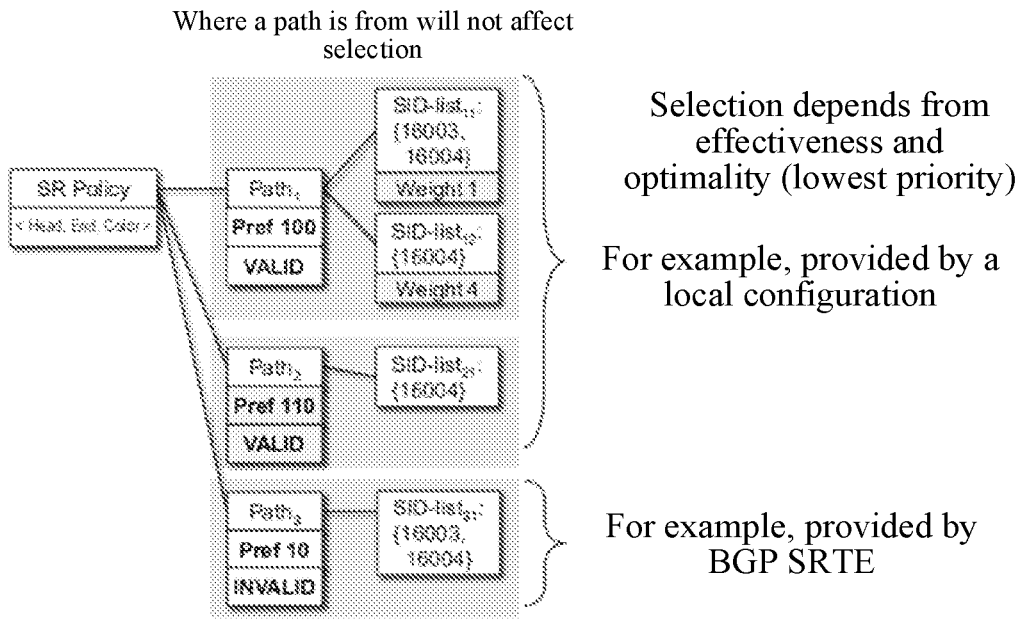
FIG. 3 is a schematic diagram illustrating candidate paths of a SR-Policy.

Referring to FIG. 3, an SR Policy contains one or more candidate paths (Candidate path, CP), and a source of the candidate paths may be manually configured or published by a Border Gateway Protocol (BGP), or informed by a Path Computation Element Communication Protocol (PCEP), or informed by a Network Configuration Protocol (NETCONF).

A unique identifier of a candidate path is a triplet <Protocol-Origin, Originator, Discriminator>.

A candidate path may be explicit, or dynamic, and "dynamic" is an optimization objective with some limitations.

A candidate path may contain one or more segment lists (SID lists), each SID list contains a weight.

Each SR Policy has an active (active) candidate path.

(3) Load Balance (LB) in the Network.

The load-sharing of a conventional network may be two-tier or three-tier, the case of the three-tier spans multiple devices.

Figure 4:
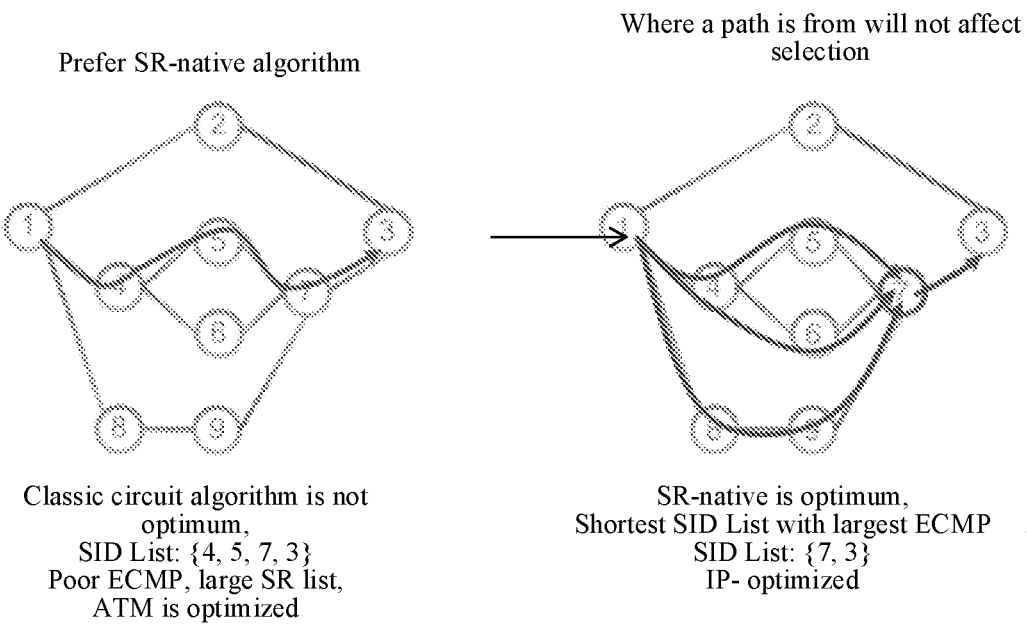
FIG. 4 is a schematic diagram of load-sharing.

As shown in FIG. 4, SR gives a better utilization of network resources. In node 1 and node 4, an Equal-Cost Multipath Routing (ECMP) is triggered. From node 1 to node 7, three equal paths are obtained. From node 4 to node 7, two equivalent paths can be obtained.

The principle of load-sharing is that if there are multiple equivalent paths for a certain routing table entry (e.g. traffic which has DA=7), then for traffic to node 7 (traffic for all applications of DA=7), HASH (HASH calculation object may be a five-tuple of traffic, etc.) is performed and the next hop of the traffic is determined according to a result of HASH.

Technical solutions in the embodiments of the present disclosure will be clearly and completely described hereinafter with reference to the drawings in the embodiments of the present disclosure, and it is obvious that the described embodiments are part of the embodiments of the present disclosure, but not all of the embodiments. Based on the embodiments in this application, all other embodiments obtained by persons of ordinary skills in the art without creative labor fall within the protection scope of this application.

The term "comprising", "including" and any variations thereof in the specification and claims of this application are intended to cover non-exclusive inclusions. For example, processes, methods, systems, products or apparatuses comprising a series of steps or units need not be limited to those clearly listed steps or units, but may include other steps or units not explicitly listed or inherent to these processes, methods, products or devices. In addition, use of "and/or" in the specification and claims means at least one of the connected objects, such as A and/or B indicates that there are three cases including A alone, B alone, and both A and B.

In embodiments of the present disclosure, such words as "exemplary" or "such as" are used to denote examples, illustrations, or descriptions. Any embodiment or design that is described as "exemplary" or "for example" in the embodiments of the present disclosure should not be construed as more preferred or advantageous than other embodiments or designs. Rather, use of the words "exemplary" or "such as" is intended to present related concepts in a specific manner.

Such terms as "system" and "network" are often used interchangeably. CDMA systems may implement radio technologies such as CDMA2000, Universal Terrestrial Radio Access (UTRA), and the like. UTRA includes wideband CDMA (Wideband Code Division Multiple Access, WCDMA) and other CDMA variants. A TDMA system may implement a radio technology such as the Global System for Mobile Communications (GSM). The OFDMA system may implement radio technologies such as Ultra Mobile Broadband (UMB), Evolved UTRA (Evolution-UTRA, E-UTRA), IEEE 802.11 (Wi-Fi), IEEE 802.16 (WiMAX), IEEE 802.20, Flash-OFDM, etc. UTRA and E-UTRA are part of a Universal Mobile Telecommunications System (UMTS). LTE and more advanced LTE (e.g. LTE-A) are new UMTS versions using E-UTRA. UTRA, E-UTRA, UMTS, LTE, LTE-A, and GSM are described in documents from an organization called the Third Generation Partnership Project (3GPP). CDMA2000 and UMB are described in a document from an organization called the Third Generation Partnership Project 2 (3GPP2). The techniques described herein may be used for both the systems and radio technologies mentioned above and for other systems and radio technologies.

Figure 5:
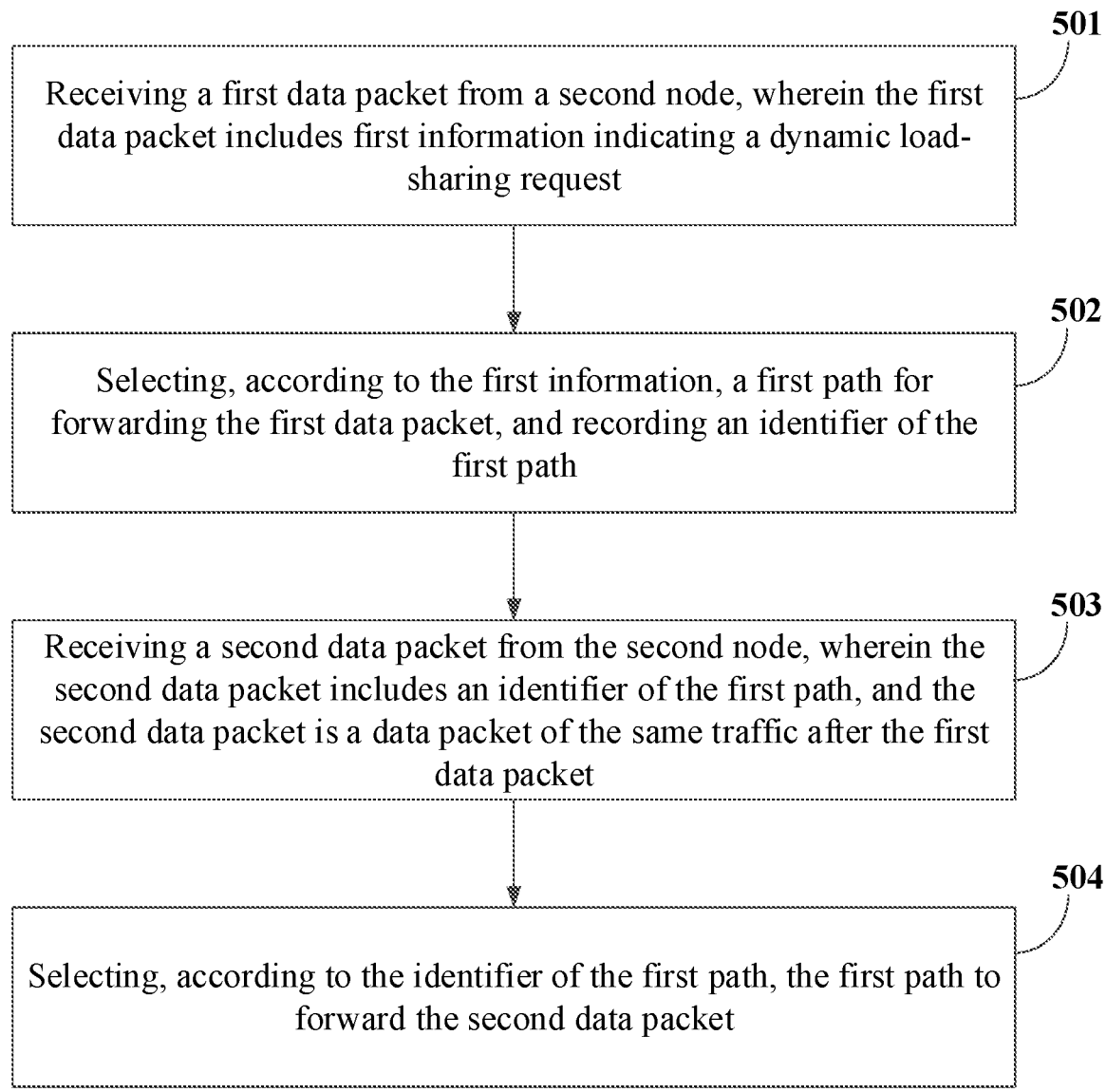
FIG. 5 is a first flowchart of a data packet transmission method according to an embodiment of the present disclosure.

Referring to FIG. 5, the embodiments of the present disclosure provide a data packet transmission method. An entity of executing the method is a first node, such as a head end (HeadEnd) in a network. Specific steps of the method include step 501, step 502, step 503 and step 504.

Step 501: receiving a first data packet from a second node, wherein the first data packet includes first information indicating a dynamic load-sharing request;

Optionally, the first node is configured with a path set, supports dynamic load-sharing and distribute/update dynamic weights, and supports dynamic traffic adjustment.

The second node may be a client in the network or an edge node of the client.

Step 502: selecting, according to the first information, a first path for forwarding the first data packet, and recording an identifier of the first path.

For example, the first path for forwarding the first data packet is selected according to the first information and a dynamic weight of the first path, and the identifier of the first path is recorded.

The dynamic weight (Weight Dynamic, Wd) is used for load-sharing of dynamic traffic (APN-supported traffic), that is, the weight of the path is not fixed but can be dynamically adjusted.

For example, in case of load-sharing of paths 1, 2, and 3, the dynamic weight may be 1:3:4, and specific implementation of the device is generally performed according to ECMP, and the traffic is divided into 8 parts, 1 part goes to path 1, 3 parts go to path 2, and 4 parts go to path 3.

In the embodiments of the present disclosure, in a scenario where a SR-Policy is deployed in a network, load balancing based on dynamic weights (Weight) is supported so that network resources and/or computing resources can be better utilized.

Step 503: receiving a second data packet from a second node, wherein the second data packet includes an identifier of the first path, and the second data packet is a data packet of the same traffic after the first data packet.

Step 504: selecting, according to the identifier of the first path, the first path to forward the second data packet.

In embodiments of the present disclosure, the first data packet is a first APN data packet, and the second data packet is a second APN data packet.

In embodiments of the present disclosure, the traffic can be distributed more evenly according to a dynamic network/a computing-power load situation in a dynamic weight HASH man.

In the embodiments of the present disclosure, the first data packet may further include second information indicating a traffic demand;

In an embodiment of the present disclosure, the step 502 may include: matching to obtain a path set according to the traffic demand (that is, the paths in the path set satisfy the demand); according to a dynamic load-sharing request, selecting a first path for forwarding the first packet from the path set, that is, performing a HASH operation to select the first path for forwarding the first packet from the path set, according to a dynamic load-sharing request.

In this way, on one hand, stability of the traffic can be guaranteed; on the other hand, load-balancing of the traffic can be carried out by considering a dynamic resource situation. Optionally, the identifier (HpathID) of the first path is (1) identification information of a Segment Routing policy (SR Policy), and the HpathID may be in the format of a BSID in a SRv6; or identification information of a segment identifier list (SID list) of the SR Policy, the HpathID may be in the format of an Adjaency SID in a SRv6.

Optionally, the path set is a SID list of the SR Policy or a set of SR Policies.

That is, the Path set may be a specific SID list of a SR Policy, and a SID list may be selected for LB; or the Path set may also be a set of SR Policy, and an SR Policy may be selected for LB, or in a lower level, a SID list is selected from the SR policy.

Embodiments of the present disclosure may directly record the SID list (may also be referred to as HpathID) in the CP of SR Policy. In addition, in some special scenario, for example, multiple SR policies of a computing-power aware network may be bound together; when performing HASH, embodiments of the present disclosure also support a bundle of SR policies, perform load-sharing of traffic uniformly according to relevant dynamic weights.

In an embodiment of the present disclosure, the dynamic weights are associated with one or more of the following:
(1) network available resource information, such as remaining bandwidth information, of the first path; it is understood that the dynamic weights may also be referred to as dynamic weight values;
(2) remaining computing power information learned by a destination node on a second path, wherein the destination node of the second path may exchange information with the computing-power supply server.

That is, the dynamic weights may be determined according to usage of network resources, or may be determined according to a network condition and a computing power condition.

In the embodiments of the present disclosure, the first node may build a path set, determine the default static weight value of each path accord to a network resource condition, and determine the dynamic weight values of the paths according to a real-time load condition. For certain traffic, such as traffic of a desired DLB nature, capabilities and intent may be specified in the packets, the first node may perform, according to the dynamic weight, a HASH to select a path Hpath2 and record the used path. The Hpath2 is directly selected for subsequent datagrams of the traffic, without performing a HASH operation again.

Figure 6:
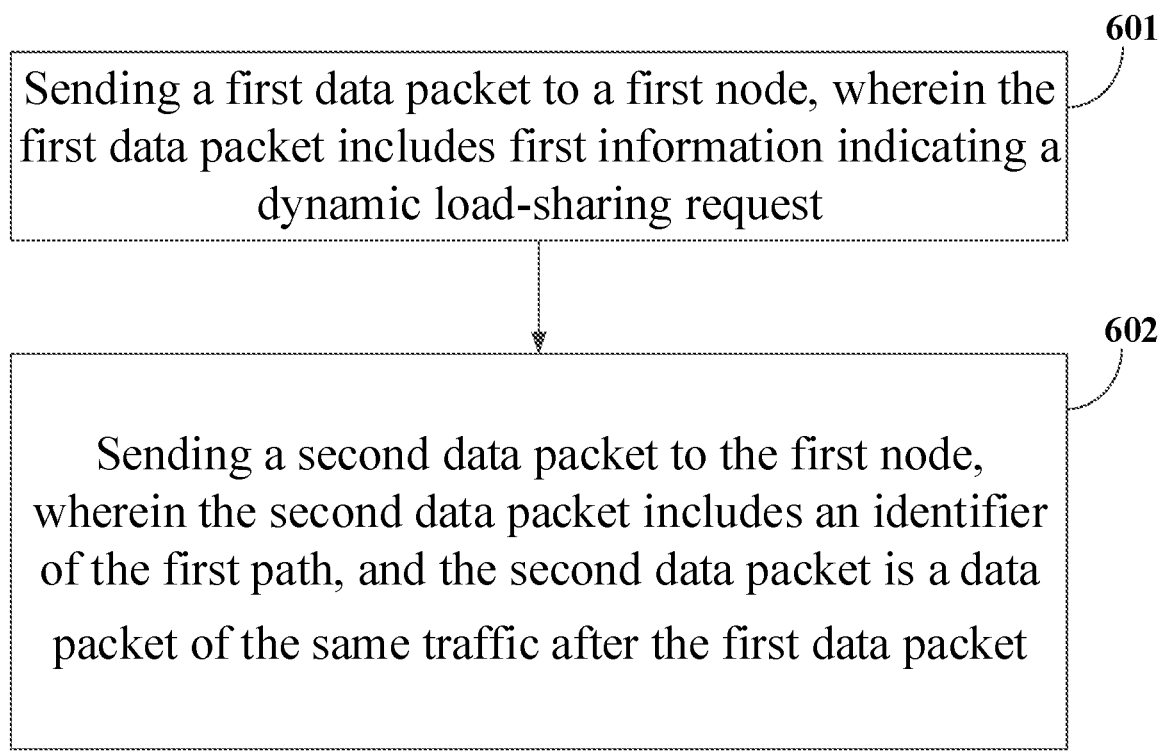
FIG. 6 is a second flowchart of a data packet transmission method according to a second embodiment of the present disclosure.

Referring to FIG. 6, an embodiment of the present disclosure provides a data packet transmission method, wherein an entity of performing the method may be a second node, such as a Client, or an edge node (Edge) of the client. The specific steps of the method include steps 601 and 602.

Step 601: sending a first data packet to a first node, wherein the first data packet includes first information indicating a dynamic load-sharing request.

Step 602: sending a second data packet to the first node, wherein the second data packet includes an identifier of the first path, and the second data packet is a data packet of the same traffic after the first data packet.

The first path is a path selected, according to the first information, by the first node for forwarding the first data packet.

Optionally, the first path is a path selected, according to the first information and the dynamic weight of the first path, by the first node to forward the first data packet.

In the embodiments of the present disclosure, the first data packet is a first APN data packet, and the second data packet is a second APN data packet.

Optionally, the identifier of the first path is (1) identification information of a segment routing policy (SR Policy), or (2) identification information of a segment identifier list (SID list) of the SR Policy.

Optionally, the path set is a SID list of the SR Policy, or a set of SR Policies.

In the embodiments of the present disclosure, the dynamic weights are associated with one or more of the following:
(1) network available resource information, such as remaining bandwidth information, of the first path;
(2) remaining computing power information learned by a destination node on a second path, wherein the destination node of the second path may exchange information with the computing-power supply server.

Example 1: APP Encapsulation

In this example, there are multiple paths between the Headend and the Endpoint in the network, and the Headend is configured with a set, and each entry has a static weight (Weight Static) of static load-sharing, which is, for example configured according to a bandwidth condition of the path; and the dynamic weight (Weight Dynamic) of dynamic load-sharing is configured, which is, for example, configured according to a bandwidth usage of the path.

The static weight (Ws) is used for load-sharing of ordinary traffic, and the dynamic weight (Wd) is used for load-sharing of dynamic traffic (traffic supporting the APN).

In this example, Headend monitors relevant conditions of three paths, and adjusts dynamic weight values according to dynamic path conditions.

Figure 7:
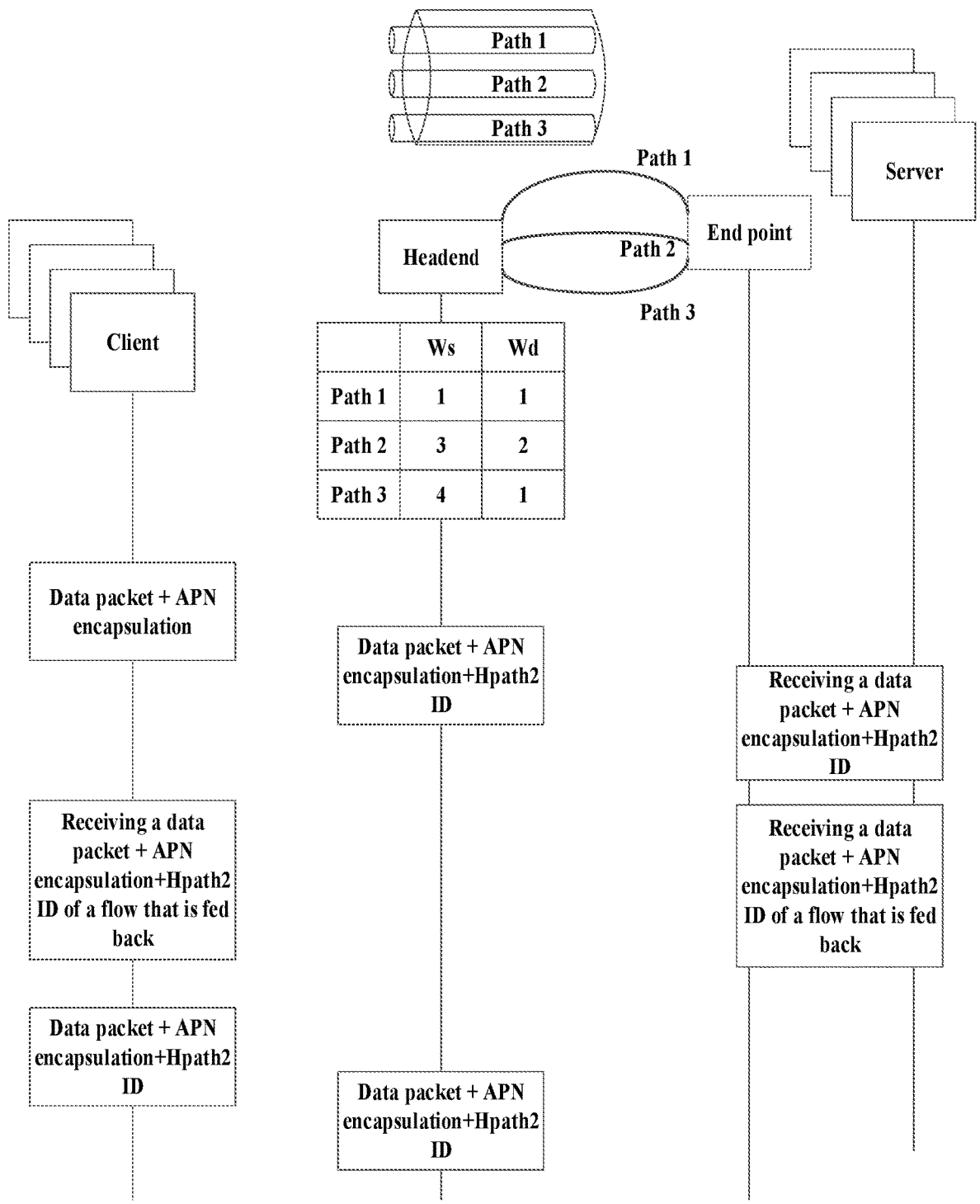
FIG. 7 is a schematic diagram of Embodiment 1 of the present disclosure.

Referring to FIG. 7, for traffic of the APN.

Step 1: a packet sent by Client carries a request (which is for example carried in a Service para option) for dynamic load-balancing (DLB), and other traffic demand.

Step 2: the Headend node matches a path set according to the traffic demand, and then performs HASH operation to select a specific path, and then the packet records the ID (HpathID2) of the specific path and sends it to the opposite end.

Step 3: the Server receives the packet containing HpathID2, and writes the HpathID2 in a feedback datagram.

Step 4: the Client receives the datagram containing HpathID2, and then inserts the previously selected Hpath (for example, which is included in the Service para option) into the datagram sent thereafter.

Step 5: the Headend node sees the selected Hpath, does not perform the HASH operation, and directly matches the path for forwarding.

Example 2: Edge Node Encapsulation

In this example, there are multiple paths between the Headend and the Endpoint, and the Headend is configured with a set, and each entry has a static weight (Ws) of static load-sharing, for example, which is configured according to the bandwidth of the path; meanwhile, the dynamic weight (Wd) of the dynamic load-sharing is configured, for example, configured according to the bandwidth usage of the path.

The static weight (Ws) is used for load-sharing of ordinary traffic, and the dynamic weight (Wd) is used for load-sharing of dynamic traffic (traffic supporting the APN).

In this example, the Headend monitors the relevant conditions of the three paths, and adjusts the dynamic weight values (Wd) according to the dynamic path conditions.

Figure 8:
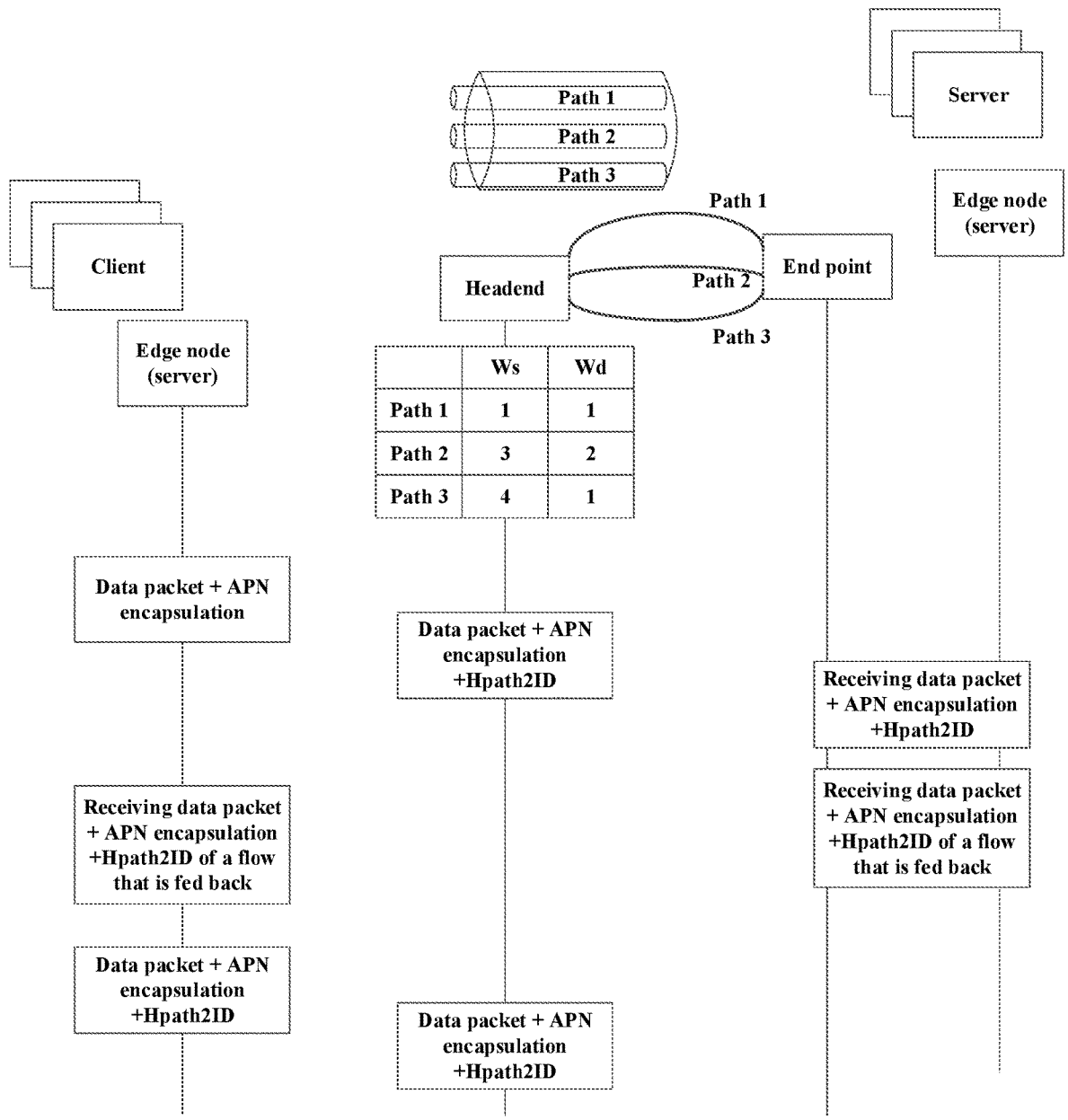
FIG. 8 is a schematic diagram of Embodiment 2 of the present disclosure.

Referring to FIG. 8, for traffic of APN.

Step 1: the Client sends a packet.

Step 2: the Edge identifies the traffic of the Client, encapsulates relevant APN information, and enables a request for dynamic load-sharing to be carried (for example, carried in the Service para option).

Step 3: the Headend matches a path Set according to the traffic demand, then performs HASH operation, and selects a specific path, and the packet records the ID (Hpath2ID) of the specific path and the packet is sent to the opposite end.

That is, the Headend receives the dynamic load-sharing request, and if it can be understood, it will trigger the use of the dynamic weight (Wd) of the DLB to perform HASH for path selection.

Step 4: the Edge on the server side receives the packet containing the Hpath2ID, and records relevant information, such as five-tuple information, and the Hpath2ID.

Step 5: the Server feeds datagrams back.

Step 6: the Edge on the server side identifies the datagram that is fed back (for example, the previously recorded datagram can be matched by a five-tuple), writes the Hpath2ID into the datagram that is fed back, and continues forwarding.

Step 7: the Edge at the client side receives the datagram containing the Hpath2ID, and records the relevant information, such as the five-tuple information and the Hpath2ID.

Step 8: the Client receives the datagram and continues to send the datagram of the traffic.

Step 9: the Edge at the client side identifies the datagram of the traffic, and inserts the selected Hpath therein.

Step 10: the Headend node recognizes the selected Hpath, does not perform the HASH operation, and directly matches the path for forwarding.

It can be understood that the Edge on the Client side and the Edge on the Server side are encapsulation nodes of the APN.

In the APN mechanism, there are two implementations:
(1) Client and Server directly support the APN mechanism, and perform APN encapsulation;
(2) Client does not support the APN mechanism, and an Edge device, connected to the network, of the Client recognizes the traffic of the Client, performs the APN encapsulates, and requests is sent to the network; the condition at the server side is similar. Thus, the APN of the network can be upgraded independently of a terminal.

It can be understood that the Edge can be considered as an edge network device, such as a gateway node.

In this example, the client edge and the server edge receive ordinary IPv6 datagrams, and they encapsulate the APN information.

Example 3: Adding Computing-Power Information

In this example, the CAN node in the network announces a computation capability and a computation load; at this time, EndPoint 1, EndPoint 2, and EndPoint 3 all announces a service ID1, and the Headend makes three SR Policies into a path set, because for a client that wants to access service1, the traffic can be load-shared to any EndPoint, and can also be considered as a large SR Policy which includes some sub-SR Policies, specific HASH paths can be a granularity of a SR Policy, or the granularity of all SID lists in a SR Policy.

Endpoint1, EndPoint 2 and EndPoint 3 carry service ID information through certain extensions when BGP announces its own capability, and it should be noted that the service IDs of the three Endpoints include the service ID1.

A user can directly use Service ID1 as a DA (a destination address) or write Service ID1 in other locations of IPv6 to indicate the desire of accessing a Service 1.

The aforementioned three SR Polices are configured as a set at the Headend, and each entry has a static weight of static load-sharing, for example, determined according to the total bandwidth of the network and/or the total computing-power of the CAN node; meanwhile, a dynamic weight for dynamic load-sharing is configured, for example, configured according to the network available bandwidth and/or the remaining computing-power setting conditions of the CAN node.

Static weights are used for load-sharing of normal traffic, and dynamic weights are used for load-sharing of dynamic traffic (traffic that supports APN).

In this example, Headend monitors the relevant conditions of the three paths, and adjusts Wd according to the dynamic conditions.

Figure 9:
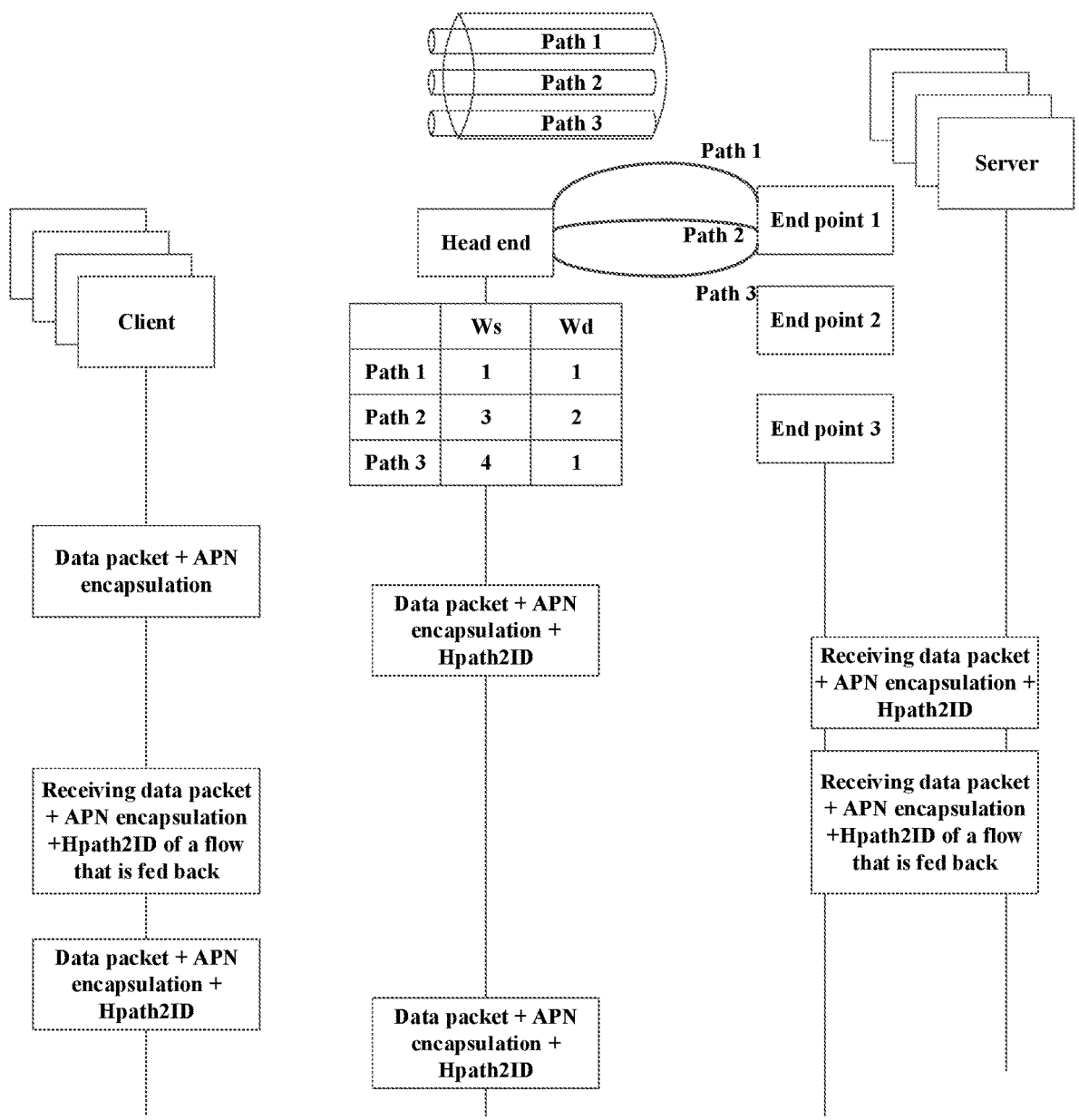
FIG. 9 is a schematic diagram of Embodiment 3 of the present disclosure.

Referring to FIG. 9, for the APN traffic.

Step 1: the packet sent by Client carries a dynamic load-sharing request (carried in an extension field of the Service para option, for example) and other traffic demand.

Step 2: the Headend node matches a path set according to the traffic demand, then performs HASH operation according to the dynamic weight, selects a specific path, and then the packet records the ID (Hpath2ID) of the specific path, and the packet is sent to the opposite end (another implementation here is to directly record the path ID (a lower level) of the SID list in the SR Policy).

There may be multiple SR Policies (there may be multiple service nodes either) when reaching the service node at this time, and there may be two implementations for the specific HASH:

1. a path set includes a plurality of SR policies, when performing HASH, which SR policy to use is determined, the packet will record the identifier of this SR policy, for example, the BSID of an SRv6;
2. a path set includes the SID lists in a SR Policy. When performing the HASH, which SID list to use is determined, the packet will record the identifier corresponding to the relevant SID list, for example, which can be in the format of Adjacency SID in a SRv6.

Step 3: the Server receives the packet containing the Hpath2ID, and writes the Hpath2ID into the datagram that is fed back.

Step 4: the client receives the datagram containing the Hpath2ID, and then inserts the selected Hpath (Service para option) into the datagram that is sent subsequently.

Step 5: the Head node sees the selected Hpath, does not perform HASH operation, and directly matches a path for forwarding.

The relevant encapsulation extensions of APNs are related in examples 1, 2 and 3.

Figure 10:
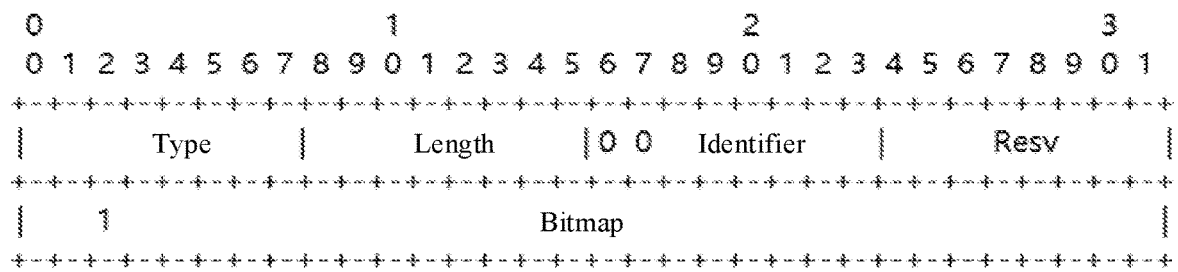
FIGS. 10-14 are schematic diagrams of APN datagrams in embodiments of the present disclosure.

1. PathInfoRequest in service-para option, see FIG. 10; which is encapsulated in e.g. DOH (an outer layer) or in the TLV of SRH:

Flag bit0 indicates that positive information is required, and bit2 indicates whether or not feedback is required;

Bitsmap is a bitmap, bit1 is currently defined as latency, bit2 is pathID, and bit3 is HpathID.

Figure 11:
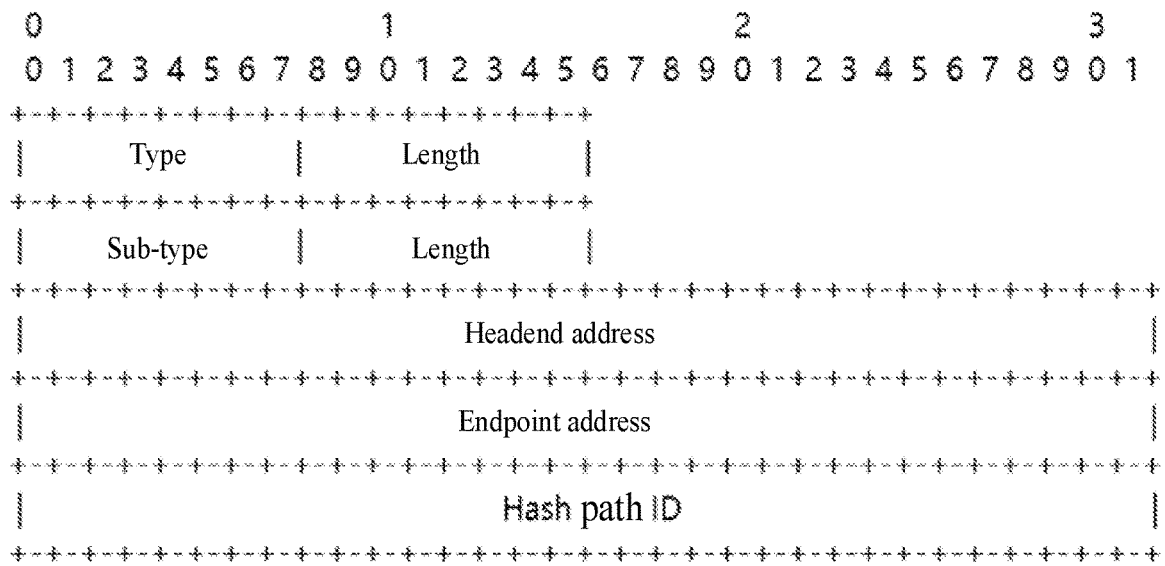
Figure 12:
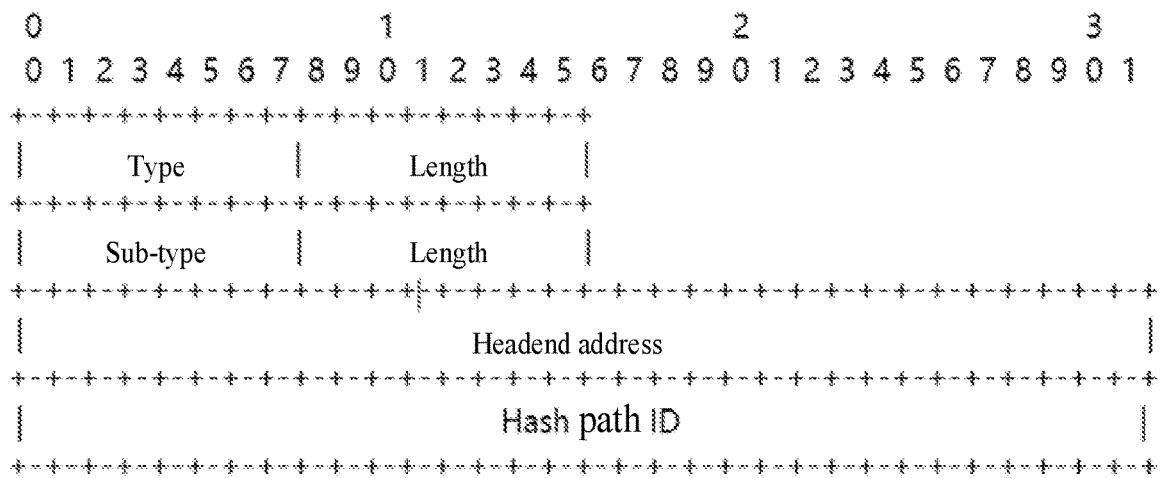
Figure 13:
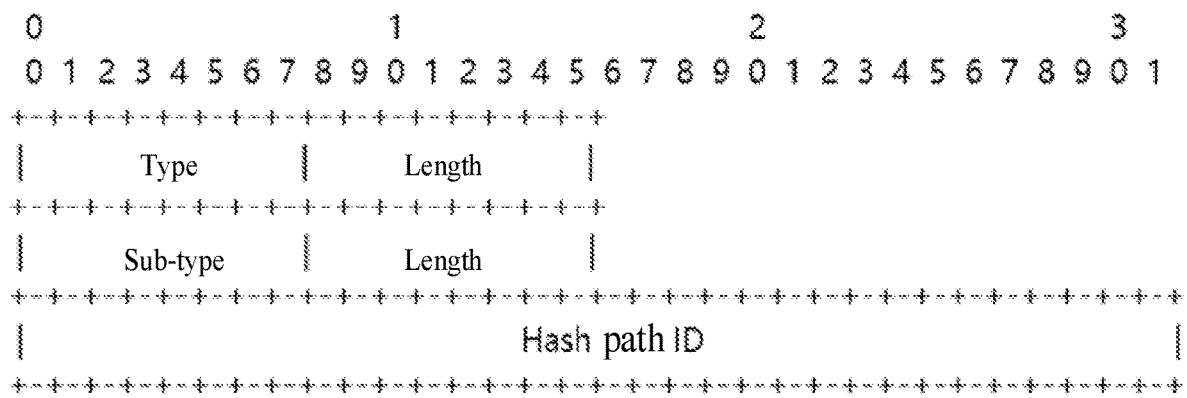

2. a new option 0x3D of the Destination Options header includes a series of sub-types, see FIG. 11, FIG. 12 and FIG. 13.

For example, one pathinfo is set to sub-type 11.

When a datagram to be encapsulated for forwarding is received and PathInfoRequest Flag bit2=0 which representing the forward direction is seen, a network entry HpathID1 is encapsulated.

In another possible implementation, sub-types 5, 6, 7, 8 contain only Hpath ID information, do not contain headend and endpoint addresses of the policy, or do not contain the endpoint address of a policy.

Figure 14:
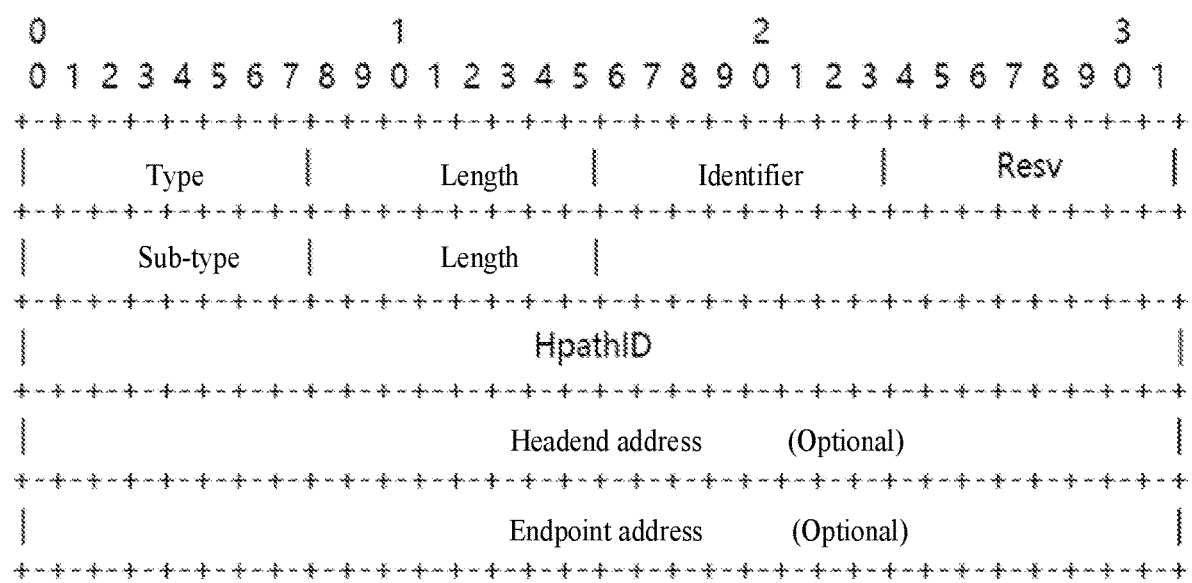

3. usage after the HpathID is collected: after the client receives a datagram that is fed back in response to the datagram, the client adds a sub-tiv of the selected HPath to a subsequent flow of the traffic, wherein main contents thereof is HpathID2. In this way, the subsequent traffic does not need to encapsulate various information of the APN, and it is enough to only include this information, thus achieving the purpose of saving an encapsulation overhead and specifying the HASH path, for example, sub-tiv type=102, as shown in FIG. 14.

When the Headend receives the sub-tiv of the selectedHPath in the service-para option, it uses the HpathID directly therein to divert a flow, rather than making decisions about how to divert a flow based on other information encapsulated by the APN.

For example, the content of the sub-type can be regarded as the sub-sub-tiv of the selectedHPath sub-tiv above, which is set to 1 and represents the HpathID.

Specifically, the format of HpathID can be a pattern similar to END.X in SRv6, END.x is unique on the device.

Figure 15:
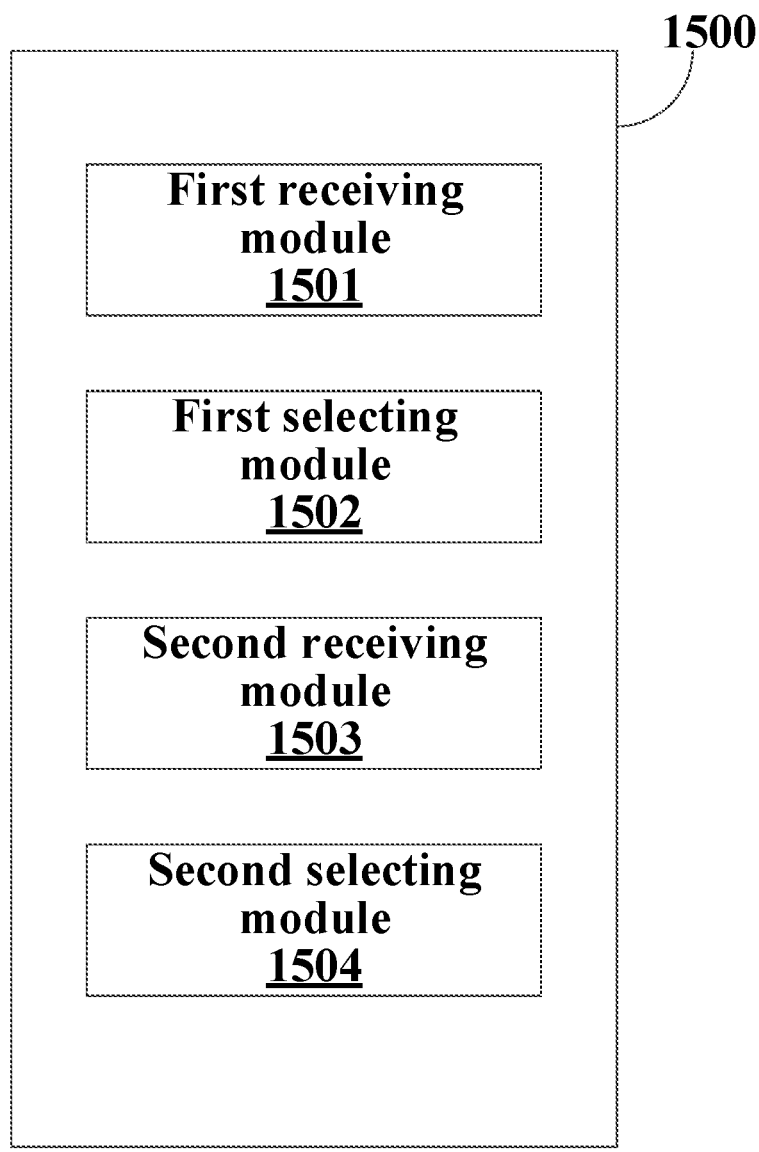
FIG. 15 is a first schematic diagram of a data packet transmission device according to an embodiment of the present disclosure.

Referring to FIG. 15, an embodiment of the present disclosure provides a data packet transmission device which is applied to a first node, and the device 1500 includes: a first receiving module 1501, configured to receive a first data packet from a second node, wherein the first data packet includes first information indicating a dynamic load-sharing request; a first selecting module 1502, configured to select, according to the first information, a first path for forwarding the first data packet, and record an identifier of the first path, wherein, the first selecting module 1502 further selects the first path for forwarding the first data packet is selected according to the first information and a dynamic weight of the first path; a second receiving module 1503, configured to receive a second data packet from a second node, wherein the second data packet includes an identifier of the first path, and the second data packet is a data packet of the same traffic after the first data packet; a second selecting module 1504, configured to select, according to the identifier of the first path, the first path to forward the second data packet.

Optionally, the first data packet is a first APN data packet, and the second data packet is a second APN data packet.

Optionally, the first data packet further includes second information indicating a traffic demand.

Optionally, the first selecting module 1502 is further configured to match to obtain a path set according to the second information; according to the first information, selecting, from the path set, a first path for forwarding the first packet.

Optionally, the identifier of the first path is identification information of a Segment Routing policy (SR Policy), or identification information of a segment identifier list (SID list) of the SR Policy.

Optionally, the path set is a SID list of SR Policy, or a set of SR Policy.

Optionally, the dynamic weights are associated with one or more of the following: network available resource information; remaining computing power information learned by a destination node on a second path, wherein the destination node of the second path may exchange information with the computing-power supply server.

The data packet transmission device provided in the embodiment of the present disclosure may execute the method embodiment shown in FIG. 6, and implementation principles and technical effects thereof are similar, and the details are not repeated here in this embodiment.

Figure 16:
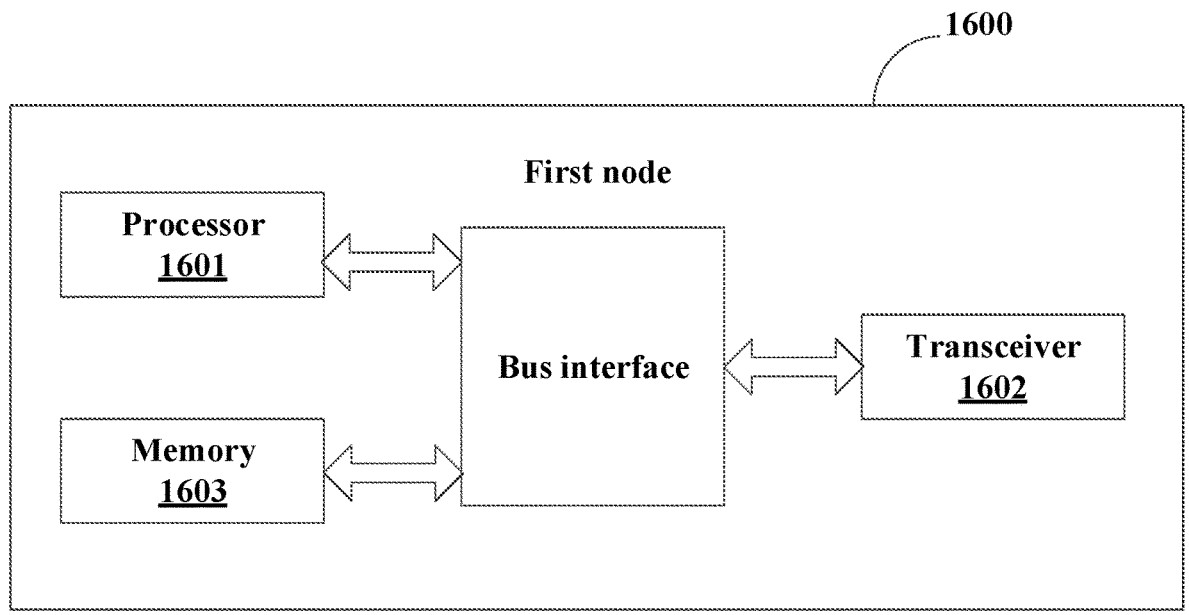
FIG. 16 is a schematic diagram of a first node according to an embodiment of the present disclosure.

Referring to FIG. 16, FIG. 16 is a structural diagram of a first node applied in the embodiment of the present disclosure. As shown in FIG. 16, the first node 1600 includes a processor 1601, a transceiver 1602, a memory 1603, and a bus interface.

In the embodiment of the present disclosure, the first node 1600 further includes a program stored on the memory 1603 and executable on the processor 1601, wherein when the program is executed by the processor 1601, the processor 1601 implements the functions of the respective modules in the embodiment shown in FIG. 15.

In FIG. 16, the bus architecture may include any number of interconnected buses and bridges, specifically, various circuits such as one or more processors represented by the processor 1601 and the memory represented by the memory 1603 are linked together. The bus architecture may also link together various other circuits, such as peripheral devices, voltage regulators, and power management circuits, which are well known in the art and, therefore, will not be described further herein. The bus interface provides an interface. The transceiver 1602 may be a number of elements, including a transmitter and a receiver, providing means for communicating with various other devices over a transmission medium.

The processor 1601 is responsible for managing the bus architecture and general processing, and the memory 1603 may store data used by the processor 1601 in performing operations.

The first node provided in the embodiment of the present disclosure can execute the method embodiment shown in FIG. 6, and implementation principles and technical effects thereof are similar, and the details are not repeated here in this embodiment.

Figure 17:
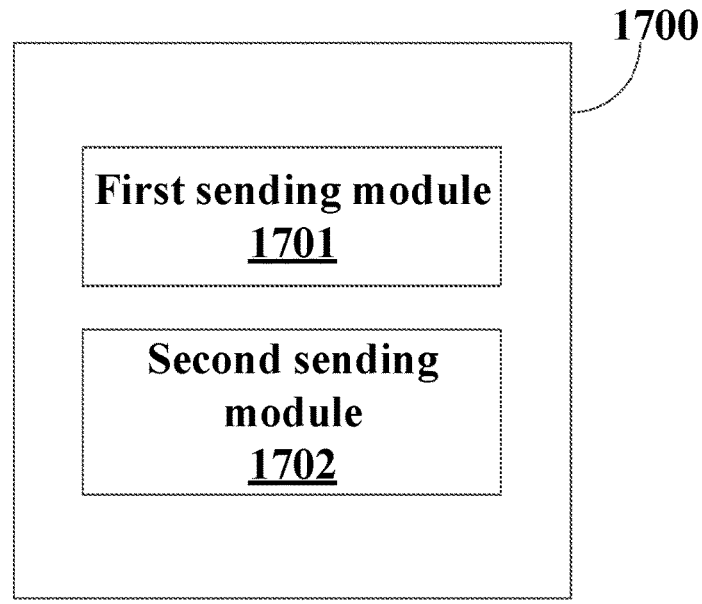
FIG. 17 is a second schematic diagram of a data packet transmission device according to an embodiment of the present disclosure.

Referring to FIG. 17, an embodiment of the present disclosure provides a data packet transmission device which is applied to a second node, and the device 1700 includes: a first sending module 1701, configured to send a first data packet to a first node, wherein the first data packet includes first information indicating a dynamic load-sharing request; a second sending module 1702, configured to send a second data packet to the first node, wherein the second data packet includes an identifier of the first path, and the second data packet is a data packet of the same traffic after the first data packet.

The first path is a path selected, according to the first information, by the first node for forwarding the first data packet. Optionally, the first path is a path selected, according to the first information and the dynamic weight of the first path, by the first node to forward the first data packet.

Optionally, the first data packet is a first APN data packet, and the second data packet is a second APN data packet.

Optionally, the identifier of the first path is identification information of a segment routing policy (SR Policy), or identification information of a segment identifier list (SID list) of the SR Policy.

Optionally, the path set is a SID list of the SR Policy, or a set of SR Policies.

Optionally, the dynamic weights are associated with one or more of the following: network available resource information of the first path; remaining computing power information learned by a destination node on a second path, wherein the destination node of the second path may exchange information with the computing-power supply server.

The data packet transmission device provided in the embodiment of the present disclosure may execute the method embodiment shown in FIG. 7, and implementation principles and technical effects thereof are similar, and the details are not repeated here in the embodiment.

Figure 18:
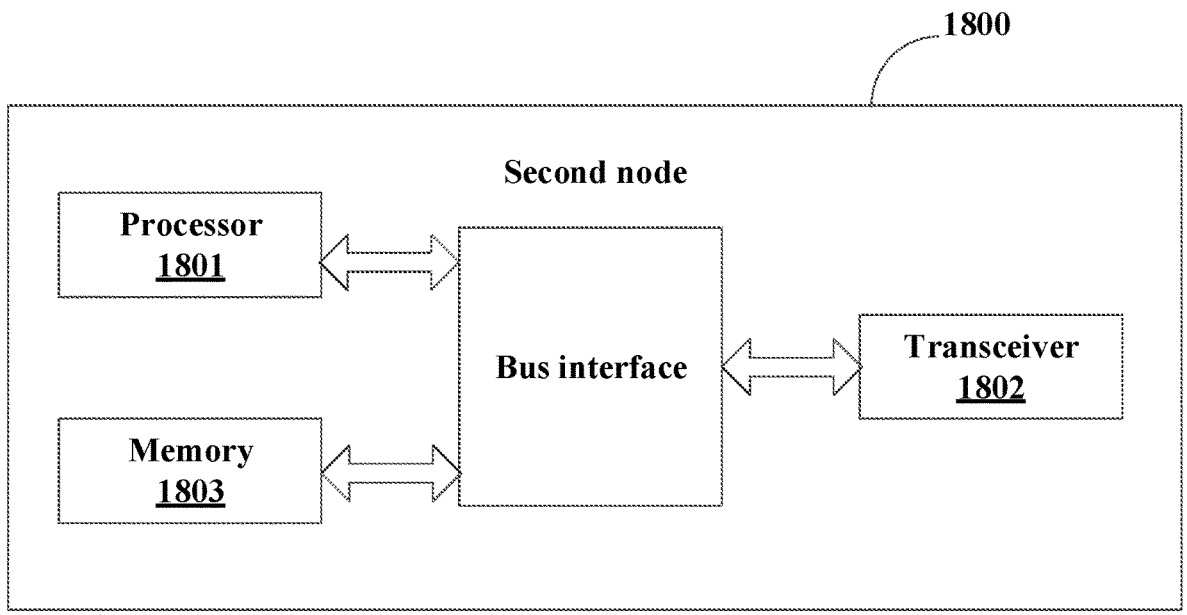
FIG. 18 is a schematic diagram of a second node according to an embodiment of the present disclosure.

Referring to FIG. 18, FIG. 18 is a structural diagram of a second node applied in an embodiment of the present application. As shown in FIG. 18, the second node 1800 includes a processor 1801, a transceiver 1802, a memory 1803, and a bus interface.

In one embodiment of the present disclosure, the second node 1800 further includes a program stored on the memory 1803 and executable on the processor 1801, wherein, when the program is executed by the processor 1801, the processor 1801 implements the functions of the respective modules in the embodiment shown in FIG. 17.

In FIG. 18, a bus architecture may include any number of interconnected buses and bridges, specifically, various circuits such as one or more processors represented by the processor 1801 and the memory represented by the memory 1803 are linked together. The bus architecture may also link together various other circuits, such as peripheral devices, voltage regulators, and power management circuits, which are well known in the art and, therefore, will not be described further herein. The bus interface provides an interface. The transceiver 1802 may be a number of elements, including a transmitter and a receiver, providing means for communicating with various other devices over a transmission medium.

The processor 1801 is responsible for managing the bus architecture and general processing, and the memory 1803 may store data used by the processor 1801 in performing operations.

The second node provided in the embodiment of the present disclosure can execute the method embodiment shown in FIG. 7, and implementation principles and technical effects thereof are similar, and the details are not repeated here in the embodiment.

The embodiments of the present disclosure also provide a readable storage medium having stored thereon a program or instruction. When the program or instruction is executed by a processor, the processor implements various processes of the method embodiments shown in FIG. 6 or FIG. 7, and the same technical effect can be achieved. In order to avoid repetition, details are not repeated here.

The processor is the processor in the terminal described in the above embodiment. The readable storage medium includes a computer readable storage medium such as a computer read only memory (Read-Only Memory, ROM), a random access memory (Random Access Memory, RAM), a magnetic disk or an optical disk, etc.

The steps of a method or an algorithm described in connection with the present disclosure may be implemented in hardware or may be implemented by way of execution of software instructions at a processor. The software instructions may consist of respective software modules. The software modules may be stored in RAM, a flash memory, a ROM, an EPROM, an EEPROM, registers, hard disks, portable hard disks, read-only optical disks, or any other form of storage medium known in the art. An exemplary storage medium is coupled to the processor such that the processor can read information from the storage medium and can write information to the storage medium. Of course, the storage medium may also be an integral part of the processor. The processor and the storage medium may be carried in the ASIC. In addition, the ASIC may be carried in a core network interface device. Of course, the processor and the storage medium may also exist as discrete components in the core network interface device.

Those skilled in the art will appreciate that in one or more of the examples described above, the functions described herein may be implemented in hardware, software, firmware, or any combination thereof. When being implemented using software, these functions may be stored in or transmitted as one or more instructions or codes on a computer-readable medium. Computer readable media include computer storage media and communication media, wherein the communication media include any media that facilitate transfer of computer programs from one place to another. The storage medium may be any available medium that a general purpose or special purpose computer can access.

The above specific embodiments have further described the objects, technical solutions and beneficial effects of the present disclosure in details, and it should be understood that the above describes only specific embodiments of the present disclosure, but is not intended to limit the protection scope of this application, and any modification, equivalent replacement, improvement, etc. made on the basis of the technical solutions of this application shall be included in the protection scope of this application.

Those skilled in the art will appreciate that embodiments of the present disclosure may be provided as methods, systems, or computer program products. Thus, embodiments of the present disclosure may take the form of an entirely hardware embodiment, an entirely software embodiment, or an embodiment combining software and hardware aspects. The embodiments of the present disclosure may employ a computer usable storage media (including, but not limited to, a disk storage, a CD-ROM, an optical storage) having computer usable program codes contained therein and implemented on a computer program product.

The embodiments of the present disclosure are described with reference to flowcharts of methods and/or block diagrams of devices (systems) and computer program products according to embodiments of the present disclosure. It is to be understood that each flow in the flowchart and/or each block in the block diagram and combinations of flows in a flowchart and/or blocks in block diagram may be implemented by computer program instructions. These computer program instructions may be provided to a processor of a general purpose computer, a special purpose computer, an embedded processor or other programmable data processing device to produce a machine, so that instructions executed by a processor of a computer or other programmable data processing devices generate a means for implementing the functions specified in one or more flows of a flowchart and/or one or more blocks of a block diagram.

These computer program instructions may also be stored in a computer-readable memory capable of directing a computer or other programmable data processing devices to operate in a particular manner, causing instructions stored in the computer-readable memory to produce an article of manufacture including an instruction means. The instruction means implements a function specified in one or more flows of the flowchart and one or more blocks of the block diagram.

These computer program instructions may also be loaded onto a computer or other programmable data processing devices such that a series of operational steps are performed on the computer or other programmable device to produce a computer-implemented process and the instructions executed on a computer or other programmable device provide steps for implementing the functions specified in one or more flows of a flowchart and/or one or more blocks of a block diagram.

It will be apparent to those skilled in the art that various modifications and variations can be made to the embodiments of the present disclosure without departing from the spirit and the scope of the present disclosure. Thus, the present disclosure is also intended to include such modifications and variations of the embodiments of the present disclosure if they fall within the scope of the claims and their equivalents.

What is claimed is:

1. A data packet transmission method performed by a first node, comprising:
   receiving a first data packet from a second node, wherein the first data packet comprises first information, the first information indicates a dynamic load-sharing request;
   selecting, according to the first information, a first path for forwarding the first data packet, and recording an identifier of the first path;
   receiving a second data packet from the second node, wherein the second data packet comprises an identifier of the first path, and the second data packet is a data packet, after the first data packet, of a same traffic;
   selecting, according to the identifier of the first path, the first path to forward the second data packet;
   wherein selecting, according to the first information, the first path for forwarding the first data packet, and recording the identifier of the first path comprises:
   selecting, according to the first information and a dynamic weight of the first path, the first path for forwarding the first data packet, and recording the identifier of the first path;
   wherein the dynamic weights are associated with one or more of the following:
   network available resource information;
   remaining computing power information learned by a destination node on a second path, wherein the destination node of the second path exchanges information with a computing-power supply server.

2. The method according to claim 1, wherein the first data packet is a first Application-Aware Networking (APN) data packet, and the second data packet is a second APN data packet.

3. The method according to claim 1, wherein the first data packet further comprises second information, the second information represents a traffic demand;
   selecting, according to the first information, the first path for forwarding the first data packet comprises:
   performing matching, according to the second information, to obtain a path set;
   according to the first information, selecting, from the path set, the first path for forwarding the first packet.

4. The method according to claim 1, wherein the identifier of the first path is identification information of a Segment Routing policy (SR Policy), or identification information of a Segment Identifier list (SID list) of the SR Policy.

5. The method according to claim 3, wherein the path set is a SID list of SR Policy, or a set of SR Policy.

6. A data packet transmission method performed by a second node, comprising:
   sending a first data packet to a first node, wherein the first data packet comprises first information, the first information indicates a dynamic load-sharing request;
   sending a second data packet to the first node, wherein the second data packet comprises an identifier of the first path, and the second data packet is a data packet, after the first data packet, of a same traffic;
   wherein the first path is a path selected, according to the first information by the first node, for forwarding the first data packet;
   wherein the first path is a path selected, according to the first information and a dynamic weight of the first path by the first node, for forwarding the first data packet;
   wherein the dynamic weight is associated with one or more of following:
   network available resource information of the first path;
   remaining computing power information learned by a destination node on a second path, wherein the destination node of the second path exchanges information with the computing-power supply server.

7. The method according to claim 6, wherein the first data packet is a first Application-Aware Networking (APN) data packet, and the second data packet is a second APN data packet.

8. The method according to claim 6, wherein the identifier of the first path is identification information of a Segment Routing policy (SR Policy), or identification information of a Segment Identifier list (SID list) of the SR Policy.

9. A first node, comprising:
   a processor, a memory, and a program stored on the memory and executable on the processor, wherein when the program is executed by the processor, the processor implements steps of the data packet transmission method according to claim 1.

10. A second node, comprising:
    a processor, a memory, and a program stored on the memory and executable on the processor, wherein, when the program is executed by the processor, the processor implements the steps of the data packet transmission method according to claim 6.

11. The first node according to claim 9, wherein the first data packet is a first Application-Aware Networking (APN) data packet, and the second data packet is a second APN data packet.

12. The first node according to claim 9, wherein the first data packet further comprises second information, the second information represents a traffic demand;
    selecting, according to the first information, the first path for forwarding the first data packet comprises:
    performing matching, according to the second information, to obtain a path set;
    according to the first information, selecting, from the path set, the first path for forwarding the first packet.

13. The second node according to claim 10, wherein the first data packet is a first Application-Aware Networking (APN) data packet, and the second data packet is a second APN data packet.

14. The second node according to claim 10, wherein the identifier of the first path is identification information of a Segment Routing policy (SR Policy), or identification information of a Segment Identifier list (SID list) of the SR Policy.

* * * * *